Figure 1:
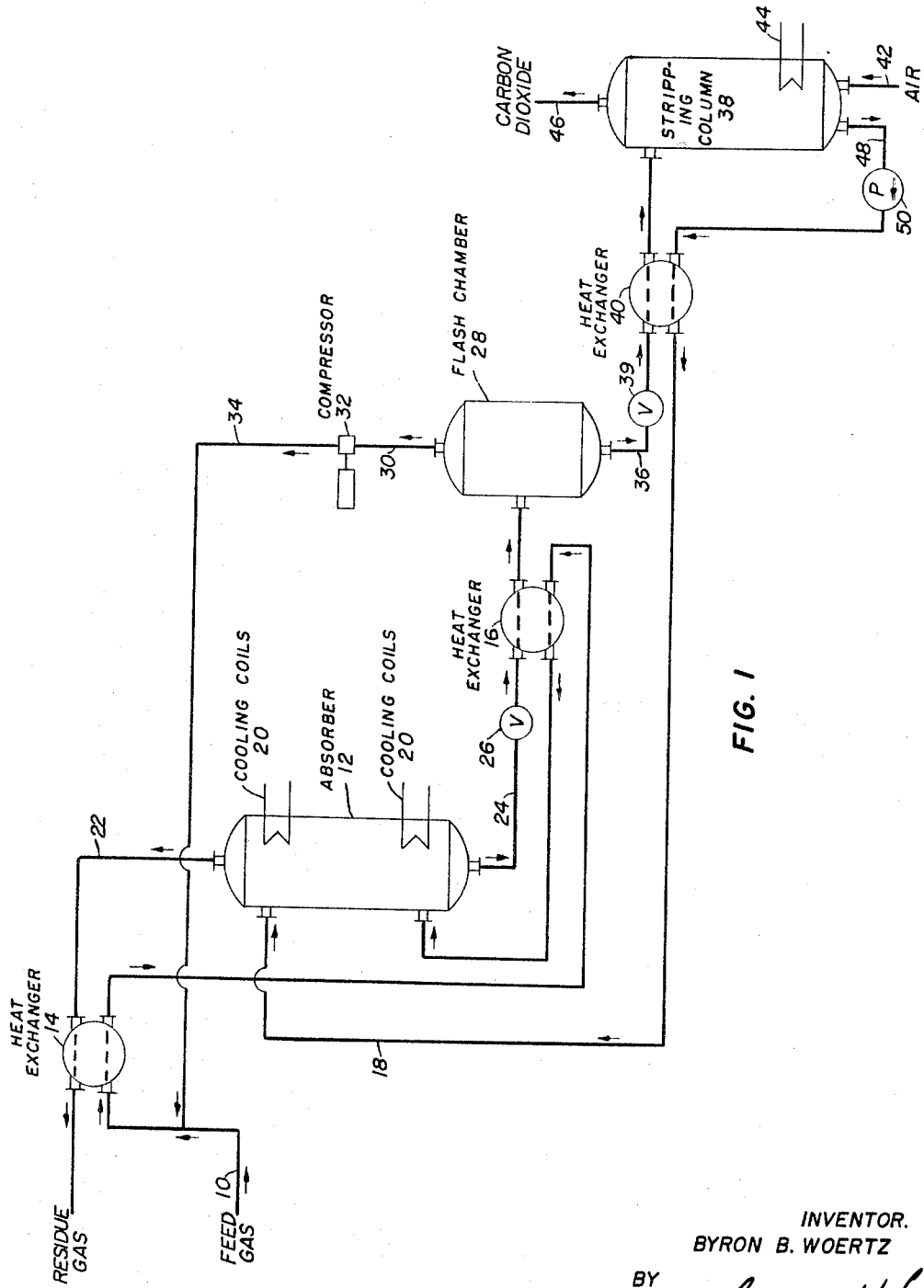

INVENTOR.
BYRON B. WOERTZ

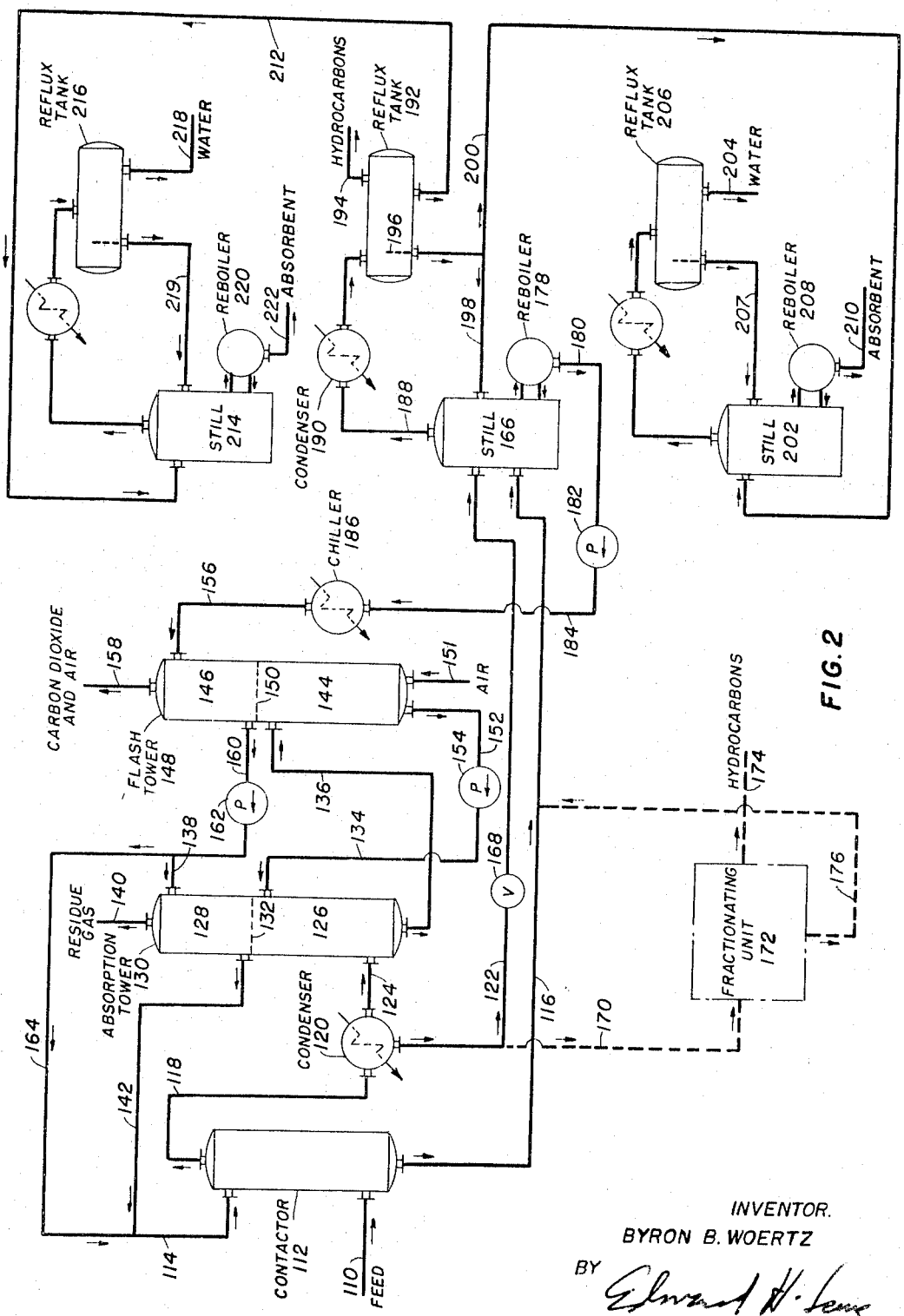

United States Patent Office 3,266,220
Patented August 16, 1966

3,266,220
PROCESS FOR REMOVING ACIDIC CONSTITUENTS FROM GASEOUS MIXTURES
Byron B. Woertz, Crystal Lake, Ill., assignor, by mesne assignments, to Union Oil Company of California, Los Angeles, Calif., a corporation of California
Filed Dec. 27, 1962, Ser. No. 247,700
12 Claims. (Cl. 55—48)

This invention relates to a selective solvent for removing acid gases from admixtures with non-acidic constituents, and more particularly, to an improved process for the removal of carbon dioxide from a gaseous mixture of hydrocarbons and/or other non-acidic constituents containing carbon dioxide by the use of a selective solvent consisting essentially of at least one ether of a carbonitrile.

The acid gas content of natural gases varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, (1) hot potassium carbonate and (2) mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor. Propylene carbonate extraction is the most economical method of removing large concentrations of carbon dioxide from high pressure methane since its capacity for carbon dioxide is high and its selectivity for extracting carbon dioxide from methane is excellent. However, its selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use with only very "lean" gas, i.e., gas having a low content of ethane and higher-molecular-weight hydrocarbons, its usefulness is restricted to the removal of carbon dioxide from natural gases produced from only a small percentage of existing fields.

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from gaseous mixtures utilizing a superior selective solvent consisting essentially of at least one ether of a carbonitrile. A still further object of this invention is to provide a process for removing carbon dioxide and moisture from gaseous mixtures containing the same utilizing a solvent consisting essentially of at least one ether of a carbonitrile in combination with a second, higher boiling, hygroscopic solvent. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out the process of this invention utilizing a solvent consisting essentially of at least one ether of a carbonitrile in combination with a higher boiling hygroscopic solvent.

This invention is based on the discovery that a solvent consisting essentially of at least one ether of a carbonitrile is an effective solvent for removing carbon dioxide from gaseous mixtures containing hydrocarbons and/or other non-acidic constituents. The ethers of carbonitriles which are effective carbon dioxide solvents in accordance with this invention are of the formula:

R—O—R'—CN wherein R and R' are aliphatic groups of 1–4 carbon atoms. R and R' may be either straight or branched chain radicals and may be either saturated or unsaturated. For example, R may be an alkyl group of 1–4 carbon atoms or an alkenyl or alkynyl group of 2–4 carbon atoms, and R' may be an alkylene group of 1–4 carbon atoms or an alkenylene or alkynylene group of 2–4 carbon atoms. Preferred ethers of carbonitriles are those having a molecular weight of about 75–115. Non-limiting examples of compounds coming within the scope of the foregoing formula and definition are:

Ethoxyacetonitrile

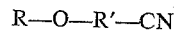
$CH_3CH_2OCH_2CN$ n-Propoxyacetonitrile $CH_3CH_2CH_2OCH_2CN$ t-Butoxyacetonitrile

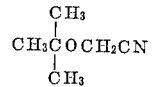

alpha-Methoxypropionitrile

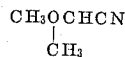

beta-Methoxypropionitrile $CH_3OCH_2CH_2CN$ beta-Ethoxypropionitrile $CH_3CH_2OCH_2CH_2CN$ beta-Isopropoxypropionitrile

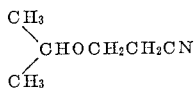

gamma-Methoxybutyronitrile $$CH_3OCH_2CH_2CH_2CN$$

beta-Ethoxybutyronitrile

beta-Methoxyacrylonitrile $$CH_3OCH=CHCN$$

beta-Ethoxyacrylonitrile $$CH_3CH_2OCH=CHCN$$

beta-Isopropoxyacrylonitrile

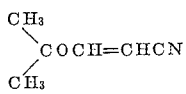

beta-Ethenoxypropionitrile $$CH_2=CHOCH_2CH_2CN$$

beta-Ethynoxyacrylonitrile $$CH\equiv COCH=CHCN$$

In general, this invention contemplates the removal of carbon dioxide from gaseous mixtures containing same by treatment with a selective solvent consisting essentially of at least one ether of a carbonitrile. While the process of this invention is especially useful for removing carbon dioxide from natural gas, it is also applicable to the treatment of any carbon dioxide-containing gaseous mixture as long as the solvent has a selectivity for extracting carbon dioxide therefrom. For example, the solvent of this invention can be used for removing carbon dioxide from flue gas, hydrogen, or reformed gas for ammonia synthesis. The selective solvents of this invention are also generally effective for removing hydrogen sulfide from gaseous mixtures.

The selective solvents of this invention may be used in the pure form and in admixture with inert solvents to modify one of the properties of the solvent, such as to modify its capacity and/or selectivity for absorbing carbon dioxide. The inert solvent is defined as one which is unreactive toward the carbonitrile ether (and other solvent constituents) and the constituents of the gas being treated. In general, the solvent mixture may contain at least about 50% by volume of at least one ether of a carbonitrile and up to about 50% by volume of at least one inert solvent. Examples of suitable solvents with which the solvent of this invention may be used in admixture include propylene carbonate, ethylene carbonate, N,N'-dimethylformamide, hydracrylonitrile, and methyl acetoacetate. Ethylene carbonate, having a melting point of about 95° F., is considered a liquid in the specification since mixtures of it with other solvents are usually liquid at ambient temperatures, e.g., 70°–80° F.

The suitability of the carbonitrile ethers as selective solvents for carbon dioxide has been demonstrated experimentally in a series of tests wherein the capacity of a number of solvents for carbon dioxide and propane, and the selectivity for carbon dioxide relative to ethane and propane, were determined. Solubilities were measured by injecting a measured volume of solvent into an evacuated Dumas bulb, measuring the vapor pressure of the solvent, and then metering in sufficient carbon dioxide to bring the bulb to atmospheric pressure. A series of calculations provided a corrected solubility of carbon dioxide at 80° F. The propane solubilities were similarly measured. The ratio of the carbon dioxide solubility to the propane solubility was termed the selectivity ratio. The results of this comparison are shown in Table I. The numbers in parentheses following the names of the prior art solvents refer to the U.S. patents in which the solvents are identified and claimed as acid gas solvents.

TABLE I

| | Solvent Capacity* | | Selectivity Ratio |
|---|---|---|---|
| | $CO_2$ | $C_3H_8$ | $CO_2/C_3H_8$ |
| β-Methoxypropionitrile | 4.23 | 2.07 | 2.04 |
| Propylene carbonate (2,926,751) | 3.20 | 1.84 | 1.74 |
| Triacetin (2,926,752) | 3.54 | 3.03 | 1.17 |
| Butyl diethylene glycol acetate (2,926,753) | 2.98 | 6.83 | 0.436 |
| Methyl alcohol | 3.50 | 5.80 | 0.60 |
| Absorber oil | 0.90 | 9.00 | 0.10 |

*The solubilities determined were the volumes of gas, measured at 80° F. and 760 mm. of mercury, which dissolved per volume of solvent when the partial pressure of the gas above the solvent was one atmosphere.

This comparison shows that while the capacity of β-methoxypropionitrile, as representative of the solvents of this invention, for propane is somewhat higher than that of propylene carbonate, the best prior art solvent of Table I, its capacity for carbon dioxide is over one-third greater than the capacity of propylene carbonate for carbon dioxide. It can also be seen that the resulting selectivity of β-methoxypropionitrile for extracting carbon dioxide from propane is over 15% greater than that of propylene carbonate. The superiority of solvents consisting essentially of at least one ether of a carbonitrile over other solvents will be apparent from the selectivity ratios given in the above table.

The process of this invention is carried out using conventional absorption procedures, wherein the gaseous mixture is contacted with the selective solvent of this invention in either batchwise or counter-current treatment. Successive batchwise extractions can also be used. In the preferred method of practicing the invention, the gaseous mixture to be treated is contacted in a countercurrent absorption tower with the absorbent in a continuous flow method. The spent solvent is continuously withdrawn from the absorption tower and is introduced into a flash chamber and/or air-stripping column to remove the absorbed gases. Vacuum flash can be substituted for air stripping, if desired. The regenerated solvent is then recycled through the absorption tower where it is used again.

The extraction process is preferably carried out at temperatures within the range of about −40° to 100° F. although higher and lower temperatures may be utilized. It will be evident that the minimum temperature at which any specific solvent can be used is the minimum temperature at which the composition is a liquid. Pressures from about 100 to 1500 p.s.i.g. (pounds per square inch gauge) may be used. The vaporization loss of the solvent is a factor to be considered in determining the contacting conditions. The maximum contact temperature should be limited to prevent an excessive loss of the solvent. In general, the feed gas and solvent are contacted at a rate of 5 to 150 gallons of solvent per M c.f. of gas measured at 14.7 p.s.i.a. and 60° F.

This invention is best understood by reference to FIGURE 1, wherein a feed gaseous mixture such as natural gas, containing carbon dioxide which is to be removed therefrom, is fed through line 10 into the bottom of absorber 12 after it passes in indirect heat exchange with the residue gas from absorber 12 in heat exchanger 14 and rich absorbent in heat exchanger 16. The absorbent consisting essentially of β-methoxypropionitrile, which is hereinafter referred to merely as the absorbent, is introduced into the top of absorber 12 through line 18. Absorber 12 can be any suitable absorption column, such as a vertically extended column, containing appropriate packing or trays to assure intimate countercurrent contact of the rising feed mixture with the downflowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about −40° to 100° F. and a pressure between about 100 and 1500 p.s.i.g. The amount and rate of carbon dioxide absorption increase directly with an increase in the pressure maintained in the absorption zone, in the lower pressure range. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed.

The rich absorbent, containing absorbed carbon dioxide, is withdrawn from absorber 12 through line 24. Then, the rich absorbent undergoes a controlled pressure reduction, such as by being passed successively through expansion valve 26 and heat exchanger 16 into flash chamber 28. Flash chamber 28 is maintained at a pressure below the pressure of absorption column 12, but above atmospheric pressure, e.g., about 50 to 400 p.s.i.g. so that the flash gas is about 5 to 10% of the inlet gas in line 10 at standard temperature and pressure. As the absorbent undergoes pressure reduction, it becomes cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32 and passed through line 34 to be mixed with the feed gas before it passes through exchanger 14. The partially desorbed absorbent is withdrawn from flash chamber 28 through line 36 and fed into stripping column 38 after it has passed successively through expansion valve 39 and exchanger 40, in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed from the absorbent and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to further cool the lean absorbent after it has passed through heat exchanger 40.

Other alternative absorption-desorption processes will be apparent to those skilled in the art. For example if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestiges of absorbed carbon dioxide before it is recycled to the absorption column. The residue gas from the absorber and/or the flash gas may be passed through a solid bed of an absorbent, such as silica gel, activated alumina, activated carbon or a synthetic zeolite, to separate vaporized absorbent therefrom.

In an alternative embodiment of this invention, the absorbent of this invention may be used in combination with a second higher boiling hygroscopic solvent which is absorptive of it, to avoid the uneconomically high solvent losses which are common in conventional processes. The hygroscopic solvent serves to remove moisture from the feed gaseous mixture, as well as to recover the absorbent which would otherwise be lost in the product gas stream. The hygroscopic solvent is any of the polyhydric alcohols or glycols which have been proposed or used for moisture extraction, such as ethylene glycol, propylene glycol, diethylene glycol, triethylene glycol and aqueous solutions thereof. Such hygroscopic solvent should be higher boiling than the selective acid gas solvent.

This alternative embodiment is best understood by reference to FIGURE 2, wherein the numeral 110 represents the line through which the gas is to be treated—for example, a natural gas consisting of hydrocarbons, carbon dioxide, and moisture—is fed into the bottom of contactor 112, in which it is countercurrently contacted with a mixture of an ether of a carbonitrile solvent, such as β-methoxypropionitrile, and a hygroscopic solvent entering through line 114. Contactor 112, which may contain any suitable type and arrangement of trays or baffles as required for the intimacy of contact between the absorbent mixture and feed gas, is preferably maintained at a temperature within the range of about 0° to 100° F. and pressure within the range of about 100 to 1500 p.s.i.g., although higher and lower temperatures and pressures may be used. A suitable example of the absorbent mixture entering contactor 112 through line 114 is 60 to 100 wt. percent of a glycol, such as diethylene glycol, 0 to 40 wt. percent of water, and 0 to 5 wt. percent of β-methoxypropionitrile. In contactor 112, a small part of the β-methoxypropionitrile content of solvent mixture may vaporize, and much of the water content of the feed gas stream is taken up by the diethylene glycol solvent. The diethylene glycol absorbent, containing water and some β-methoxypropionitrile absorbent, is withdrawn from contactor 112 through line 116. The resulting natural gas containing some β-methoxypropionitrile leaves contactor 112 through line 118, and flows to chiller-condenser 120, in which its temperature is reduced to absorption temperature, for example, −40° to 80° F. Condensed hydrocarbons, β-methoxypropionitrile and/or water are withdrawn from chiller-condenser 120 through line 122.

The chilled, uncondensed components of the natural gas-β-methoxypropionitrile absorbent mixture pass from chiller-condenser 120 through line 124 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the down-flowing absorbent. In section 126, the gas is countercurrently contacted with β-methoxypropionitrile absorbent entering through line 134, which removes at least part of the acid gas constituents. Rich β-methoxypropionitrile containing absorbed carbon dioxide is withdrawn from absorption tower 130 through line 136. The scrubbed natural gas passes on upward in tower 130 past trap-out tray 132 into upper section 128, where it is counter-currently contacted with the glycol absorbent entering through line 138. The diethylene glycol absorbent scrubs any vaporized β-methoxypropionitrile absorbent from the natural gas and the scrubbed natural gas product of reduced carbon dioxide content is withdrawn through line 140 to a suitable receiver or other disposition. The mixture of glycol and β-methoxypropionitrile absorbents from upper section 128 is trapped on tray 132, and is withdrawn through line 142 and introduced into contactor 112 through line 114.

The β-methoxypropionitrile absorbent in line 136 enters a combined flashing and contacting zone which, as illustrated, may be lower flashing zone 144 and upper contacting zone 146 in a single vertically extended flash tower 148, with the upper and lower sections being separated by liquid trap-out tray 150. The rich β-methoxypropionitrile absorbent enters flash zone 144, which is maintained at a pressure below the absorption column pressure and usually at about atmospheric pressure, where it undergoes pressure reduction to flash-off absorbed carbon dioxide. If desired, air or other inert stripping gas is introduced into zone 144 through line 151. The lean β-methoxypropionitrile absorbent is withdrawn from flash zone 144 through line 152 and is introduced back to absorption tower 130 by pump 154 through line 134. Carbon dioxide and stripping gas containing entrained and vaporized β-methoxypropionitrile absorbent leaves flash zone 144, and it passes through trap-out tray 150 into contacting zone 146 where it is countercurrently contacted with diethylene glycol solvent entering through line 156. The diethylene glycol scrubs any vaporized β-methoxypropionitrile absorbent from the carbon dioxide, and the carbon dioxide and stripping gas are withdrawn through line 158 to be disposed of as desired. This carbon dioxide is suitable for use in miscibly flooding oil reservoirs, if stripping gas contamination is low.

The resulting mixture of the diethylene glycol and β-methoxypropionitrile absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent, containing water and β-methoxypropionitrile in line 116 and the condensate in line 122 are introduced into glycol still 166, with the condensate in line 122 being introduced into still 166 at a point higher than that where the liquid in line 116 is introduced. Alternatively, with valve 168 closed, condensate in line 122 is passed through line 170 into fractionating unit 172 where hydrocarbons are recovered from the condensate. The hydrocarbons are removed through line 174 and the remaining glycol and β-methoxypropionitrile are withdrawn through line 176 and mixed with the liquid in line 116.

Glycol still 166 is equipped with reboiler 178 from which regenerated diethylene glycol is withdrawn through line 180 and forced by pump 182 successively through line 184, chiller 186, and line 156 to contacting zone 146 of vessel 148. Overhead from still 166, comprising β-methoxypropionitrile absorbent, water, and hydrocarbons, is passed through line 188 and condenser 190 into reflux tank 192. Non-condensable hydrocarbon gases are vented from reflux tank 192 by line 194. Since the β-methoxypropionitrile absorbent is lighter than water and not completely water miscible, it is separated from the water in reflux tank 192 by providing reflux tank with short standpipe 196 through which the β-methoxypropionitrile is withdrawn. The lighter β-methoxypropionitrile absorbent layer is withdrawn from reflux tank 192 and part of it is returned to still 166, as reflux, through line 198 and the remaining portion is passed through line 200 into β-methoxypropionitrile still 202. Water is removed from the β-methoxypropionitrile absorbent in still 202 and is discarded through line 204 of reflux tank 206, or transferred to line 212. β-methoxypropionitrile carried overhead from still 202 with the water, and separated therefrom in reflux tank 206, is returned to still 202 through line 207. Substantially dry β-methoxypropionitrile absorbent is removed from reboiler 208 through line 210 and returned to the system.

The water separated from the β-methoxypropionitrile in reflux tank 192 is passed through line 212 into water still 214. As hereinabove pointed out, the water withdrawn from reflux tank 206 through line 204 may be combined with the water in line 212. The water, which is carried overhead from still 214 with some β-methoxypropionitrile, is removed from reflux tank 216 through line 218 and discarded, while the lighter β-methoxypropionitrile is returned to still 214 from reflux tank 216 through line 219. β-methoxypropionitrile is withdrawn from reboiler 220 of still 214 through line 222 and returned to the system.

Since a small amount of water in the β-methoxypropionitrile absorbent is not especially detrimental to its effectiveness in absorbing carbon dioxide, β-methoxypropionitrile still 202 may not be required in many instances. In any case, glycol still 166, β-methoxypropionitrile still 202, and water still 214 need be only relatively small units.

The following specific example will serve more particularly to point out the instant invention.

*Example I*

Tables II and III are illustrative of the process streams of the process depicted in FIGURE 1 wherein a natural gas mixture is treated in absorber 12, containing ten theoretical trays and maintained at 600 p.s.i.a. and 70° F., with the lean absorbent. One hundred mols of the natural gas per unit time are contacted in different runs with β-methoxypropionitrile and propylene carbonate in such amounts that the residue gas contains about 2 volume percent of carbon dioxide. The rich absorbent withdrawn from absorber 12 is isothermally flashed at 150–200 p.s.i.a. in flash chamber 28 and the pressure of the partially desorbed absorbent withdrawn from flash chamber 28 is reduced to atmospheric pressure in stripping column 38. Table II gives the compositions of the process streams where the gas is contacted with β-methoxypropionitrile and, for the purpose of comparison, Table III gives the composition of the process streams wherein the gas is contacted with the propylene carbonate. From an inspection of Tables II and III it can be seen that β-methoxypropionitrile has a higher capacity for carbon dioxide than propylene carbonate, since the required solvent circulation is only 55.9 gallons of β-methoxypropionitrile per M c.f. of inlet gas as compared to 66.9 gal./M c.f. when using propylene carbonate (gas and solvent volumes measured at 14.7 p.s.i.a. and 60° F.).

TABLE II

Solvent: β-Methoxypropionitrile
Absorber Maintained at 70° F. and 600 p.s.i.a.
Absorbent Circulation Rate of 55.9 Gal./M c.f. of feed Gas
Rich Absorbent Flashed at 70°F. and 200 p.s.i.a.

| Component | Mols of Inlet Gas (Line 10) | Residue Gas (Line 22) | | Mols of Rich Solvent (Line 24) | Mols of Flash Gas (Line 30) | Mols of Atmos. Strip Gas (Line 46) | Percent Loss |
| --- | --- | --- | --- | --- | --- | --- | --- |
| | | Mols | Mols percent | | | | |
| Methane | 72.0 | 70.65 | 90.73 | 6.61 | 5.26 | 1.35 | 1.9 |
| Ethane | 6.0 | 4.78 | 6.14 | 2.42 | 1.20 | 1.22 | 20.3 |
| Propane | 2.0 | 0.82 | 1.05 | 1.67 | 0.49 | 1.18 | 59.0 |
| CO₂ | 19.0 | 1.55 | 1.99 | 22.08 | 4.65 | 17.44 | 91.8 |
| n-Butane | 1.0 | 0.07 | 0.09 | 1.10 | 0.18 | 0.92 | 92.0 |
| Absorbent | | 0 | 0 | 195.70 | 0 | 0 | |
| Total | 100.00 | 77.87 | 100.00 | 229.58 | 11.78 | 22.11 | |

TABLE III

Solvent: Propylene Carbonate
Absorber Maintained at 70° F. and 600 p.s.i.a.
Absorbent Circulation Rate of 66.9 Gal./M c.f. of Feed Gas
Rich Absorbent Flashed at 70° F. and 150 p.s.i.a.

| Component | Mols of Inlet Gas (Line 10) | Residue Gas (Line 22) Mols | Residue Gas (Line 22) Mols percent | Mols of Rich Solvent (Line 24) | Mols of Flash Gas (Line 30) | Mols of Atmos. Strip Gas (Line 46) | Percent Loss |
|---|---|---|---|---|---|---|---|
| Methane | 72.0 | 71.33 | 89.69 | 4.92 | 4.24 | 0.67 | 0.93 |
| Ethane | 6.0 | 5.36 | 6.74 | 1.63 | 0.99 | 0.64 | 10.7 |
| Propane | 2.0 | 1.19 | 1.49 | 1.32 | 0.51 | 0.81 | 40.5 |
| CO$_2$ | 19.0 | 1.59 | 2.00 | 24.11 | 6.74 | 17.37 | 91.4 |
| n-Butane | 1.0 | 0.06 | 0.08 | 1.20 | 0.27 | 0.93 | 93.0 |
| Absorbent | 0 | 0 | 0 | 253.24 | 0 | 0 |  |
| Total | 100.00 | 79.53 | 100.00 | 286.42 | 12.75 | 20.42 |  |

The embodiments of the invention in which an exclusive property or privilege is claimed are defined as follows:

1. The process of removing gaseous acid gas of the group consisting of carbon dioxide and hydrogen sulfide from admixture with gaseous $C_1$–$C_3$ alkane hydrocarbons which comprises contacting said gaseous admixture with a solvent consisting essentially of at least one ether of a carbonitrile of the formula,

R—O—R'—CN wherein R and R' are aliphatic radicals containing 1 to 4 carbon atoms, under conditions resulting in selective absorption of said acid gas, and separating the unabsorbed components of said gaseous admixture from said solvent.

2. The process according to claim 1 in which said acid gas is carbon dioxide and said ether of a carbonitrile has a molecular weight of about 75 to 115.

3. The process according to claim 2 in which said solvent contains an inert liquid selected from the group consisting of propylene carbonate, ethylene carbonate, hydracrylonitrile, methyl acetoacetate, and N,N-dimethylformamide.

4. The process according to claim 2 in which said ether of a carbonitrile is β-methoxypropionitrile.

5. The process according to claim 2 in which said gaseous admixture is passed through an absorption zone at superatmospheric pressure in countercurrent contact with said solvent and a stream of rich solvent is removed from said absorption zone and the pressure thereof is reduced to flash off carbon dioxide and at least part of the residual carbon dioxide is removed from said solvent stream following said pressure reduction and the desorbed solvent is recycled to the absorption zone.

6. The process according to claim 5 in which said contacting is carried out at a temperature from about −40° to 100° F. and a pressure from about 100 to 1500 p.s.i.g.

7. The process of removing a gaseous acid gas selected from the group consisting of carbon dioxide and hydrogen sulfide from admixture with gaseous $C_1$–$C_3$ alkane hydrocarbons, which comprises contacting the gaseous admixture, at a temperature of about −40° to 100° F. and a pressure of about 100 to 1500 p.s.i.g., with a solvent consisting essentially of at least one ether of a carbonitrile of the formula,

R—O—R'—CN wherein R is of the group consisting of $C_1$–$C_4$ alkyl, $C_2$–$C_4$ alkenyl, and $C_2$–$C_4$ alkynyl radicals and R' is of the group consisting of $C_1$–$C_4$ alkylene, $C_2$–$C_4$ alkenylene, and $C_2$–$C_4$ alkynylene radicals, at a rate of about 5 to 150 gallons of solvent per M c.f. of the gaseous admixture measured at 14.7 p.s.i.a. and 60° F., and separating the unabsorbed components of said gaseous admixture from said solvent.

8. The process of removing a gaseous acid gas of the group consisting of carbon dioxide and hydrogen sulfide from admixture with gaseous $C_1$–$C_3$ alkane hydrocarbons, which comprises contacting said gaseous admixture in a first contacting zone with a mixture of a first solvent consisting essentially of at least one ether of a carbonitrile of the formula,

R—O—R'—CN wherein R and R' are aliphatic radicals containing 1 to 4 carbon atoms, and a second, higher boiling solvent adapted to absorb said first solvent; separately withdrawing a liquid stream consisting essentially of said second solvent and a gaseous stream comprising vaporized first solvent and unabsorbed components of said admixture fed to said first contacting zone from said first contacting zone; passing said gaseous stream through a cooling zone whereby part of said gaseous stream is condensed; separately withdrawing condensate and uncondensed components of said gaseous stream from said first cooling zone; combining said condensate with said liquid stream from said first contacting zone and separating absorbed second solvent from said combined solution; contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from second contacting zone; contacting the gaseous stream from said second contacting zone in a third contacting zone with said second solvent, under conditions resulting in absorption of vaporized first solvent; separately withdrawing from said third contacting zone the unabsorbed components of the gaseous stream from said second contacting zone and said second solvent containing absorbed first solvent; recycling said second solvent from said third contacting zone to said first contacting zone; and separating the absorbed acid gas from said spent first solvent.

9. The process according to claim 8 in which the pressure of said spent first solvent is reduced in a desorbing zone to flash off acid gas, and the acid gas separated from said spent first solvent in said desorbing zone is contacted with said second solvent in a fourth contacting zone whereby entrained vaporized first solvent is absorbed.

10. The process according to claim 9 in which said second solvent withdrawn from said first contacting zone is introduced into said fourth contacting zone after at least part of the first solvent is removed therefrom.

11. The process according to claim 10 in which a stream of said second solvent is removed from said fourth contacting zone and parts thereof are introduced into said first and third contacting zones.

12. The process according to claim 11 in which said second solvent is a glycol and said ether of a carbonitrile is β-methoxypropionitrile.

References Cited by the Examiner

UNITED STATES PATENTS 2,139,375  12/1938  Millar et al. _____ 55—73
2,486,778  11/1949  Doumani _____ 23—2

(Other references on following page)

UNITED STATES PATENTS

| | | | |
|---|---|---|---|
| 2,668,748 | 2/1954 | Asbury | 23—150 X |
| 2,781,863 | 2/1957 | Bloch et al. | 55—73 X |
| 2,863,527 | 12/1958 | Herbert et al. | |
| 2,926,751 | 3/1960 | Kohl et al. | 55—68 X |
| 3,097,917 | 7/1963 | Dotts et al. | 55—73 X |
| 3,137,654 | 1/1964 | Johnson et al. | 23—2 X |

FOREIGN PATENTS

| | | |
|---|---|---|
| 596,692 | 4/1960 | Canada. |
| 596,693 | 4/1960 | Canada. |
| 728,444 | 4/1955 | Great Britain. |
| 750,399 | 6/1956 | Great Britain. |

REUBEN FRIEDMAN, *Primary Examiner.*

D. TALBERT, *Assistant Examiner.*